Figure 1:
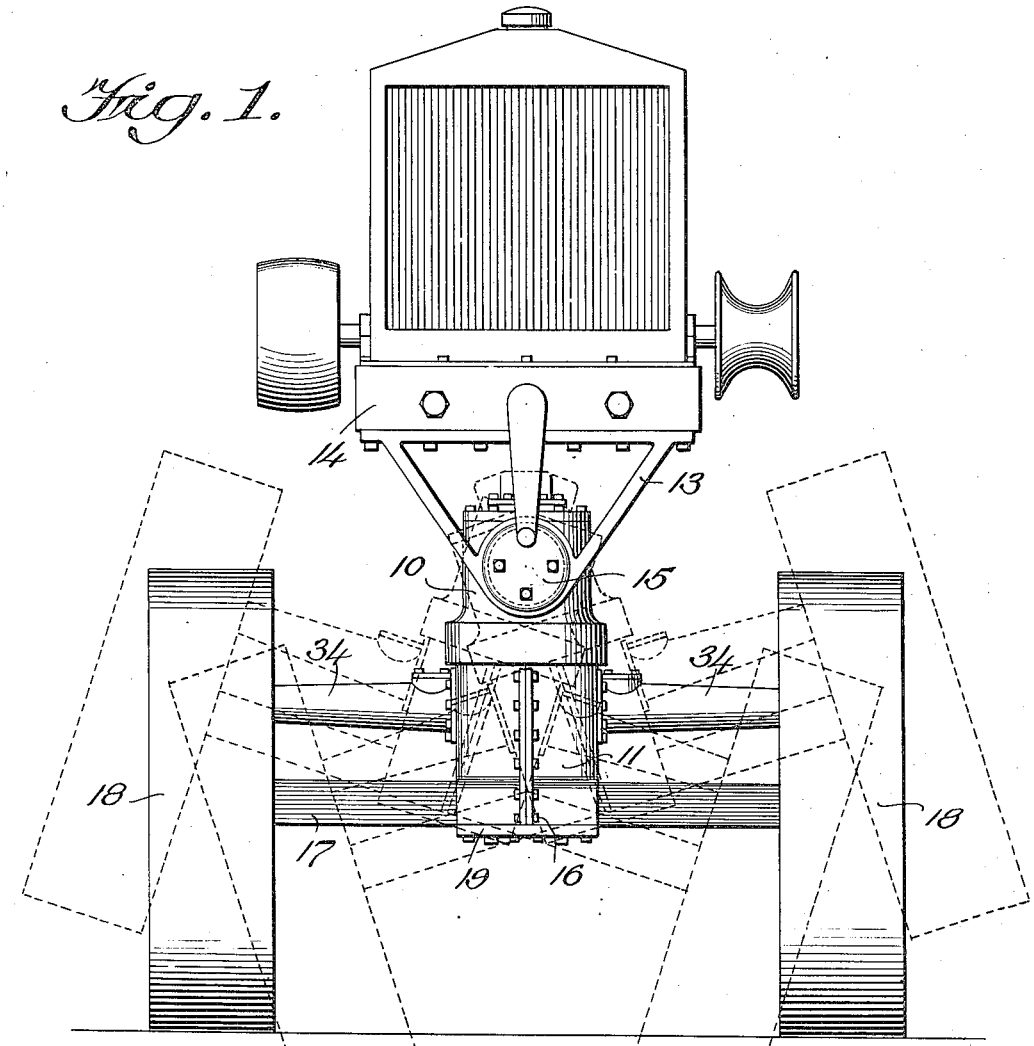

Feb. 27, 1923.

J. E. GORE.
POWER TRANSMISSION MECHANISM.
FILED MAR. 30, 1921.

1,447,073.

Inventor
J. E. Gore,
by Henry P. Bright
Attorney

Feb. 27, 1923.

J. E. GORE.
POWER TRANSMISSION MECHANISM.
FILED MAR. 30, 1921.

Inventor
J. E. Gore,
by Henry V. Bright
Attorney

Patented Feb. 27, 1923.

1,447,073

UNITED STATES PATENT OFFICE.

JAMES EZRA GORE, OF SPOKANE, WASHINGTON, ASSIGNOR, BY DIRECT AND MESNE ASSIGNMENTS, TO GORE TRACTOR COMPANY, INC., OF SPOKANE, WASHINGTON, A CORPORATION OF WASHINGTON.

POWER-TRANSMISSION MECHANISM.

Application filed March 30, 1921. Serial No. 456,811.

*To all whom it may concern:*

Be it known that I, JAMES E. GORE, a citizen of the United States, and resident of Spokane, in the county of Spokane and State of Washington, have invented certain new and useful Improvements in Power-Transmission Mechanism, of which the following is a specification.

My invention relates to mechanism particularly designed for use upon tractors and other vehicles whereby power may be delivered to the wheels thereof for driving the same and whereby movements of said wheels are permitted for steering purposes and to accommodate themselves to irregularities in the road traversed. My invention, however, is not limited to this purpose, but is capable of various other uses wherever it is desired to transmit power between shafts which are relatively angularly movable.

An important purpose of my invention is to provide a comparatively simple, inexpensive and compact mechanism of the character mentioned which is capable of delivering maximum power from one shaft to another irrespective of the relative angular relation of said shafts, and which is dust proof and self-lubricating, thereby assuring its longevity with minimum attention.

More particularly my invention consists in certain novel details of construction, combination and arrangement of parts as will be hereinafter more fully described, illustrated in the accompanying drawings and claimed.

My inventive idea is capable of embodiment in a variety of mechanical structures, one of which is illustrated in the accompanying drawings, but it is to be understood that the structure shown is merely intended to disclose the essential features of my invention in a preferred form and that its scope is as defined in the appended claim.

In the drawings, wherein like characters of reference denote corresponding parts in the different views:—

Figure 2:
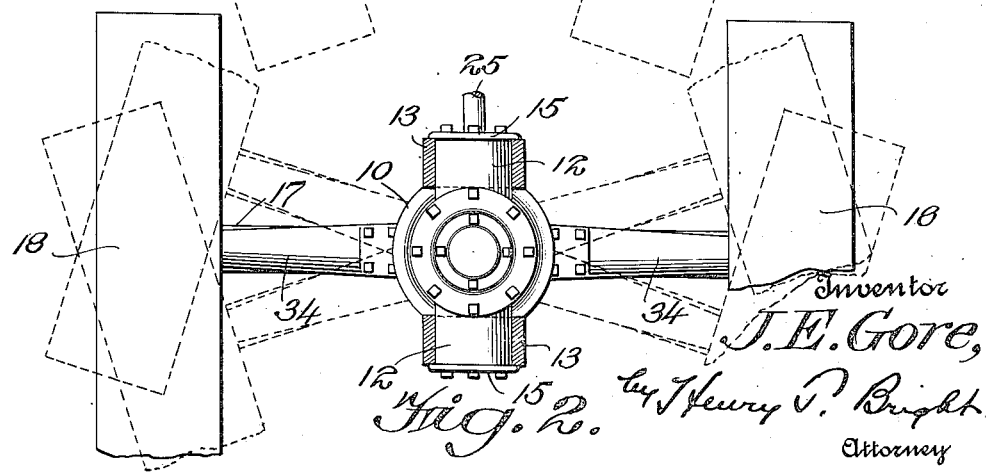
Figure 3:
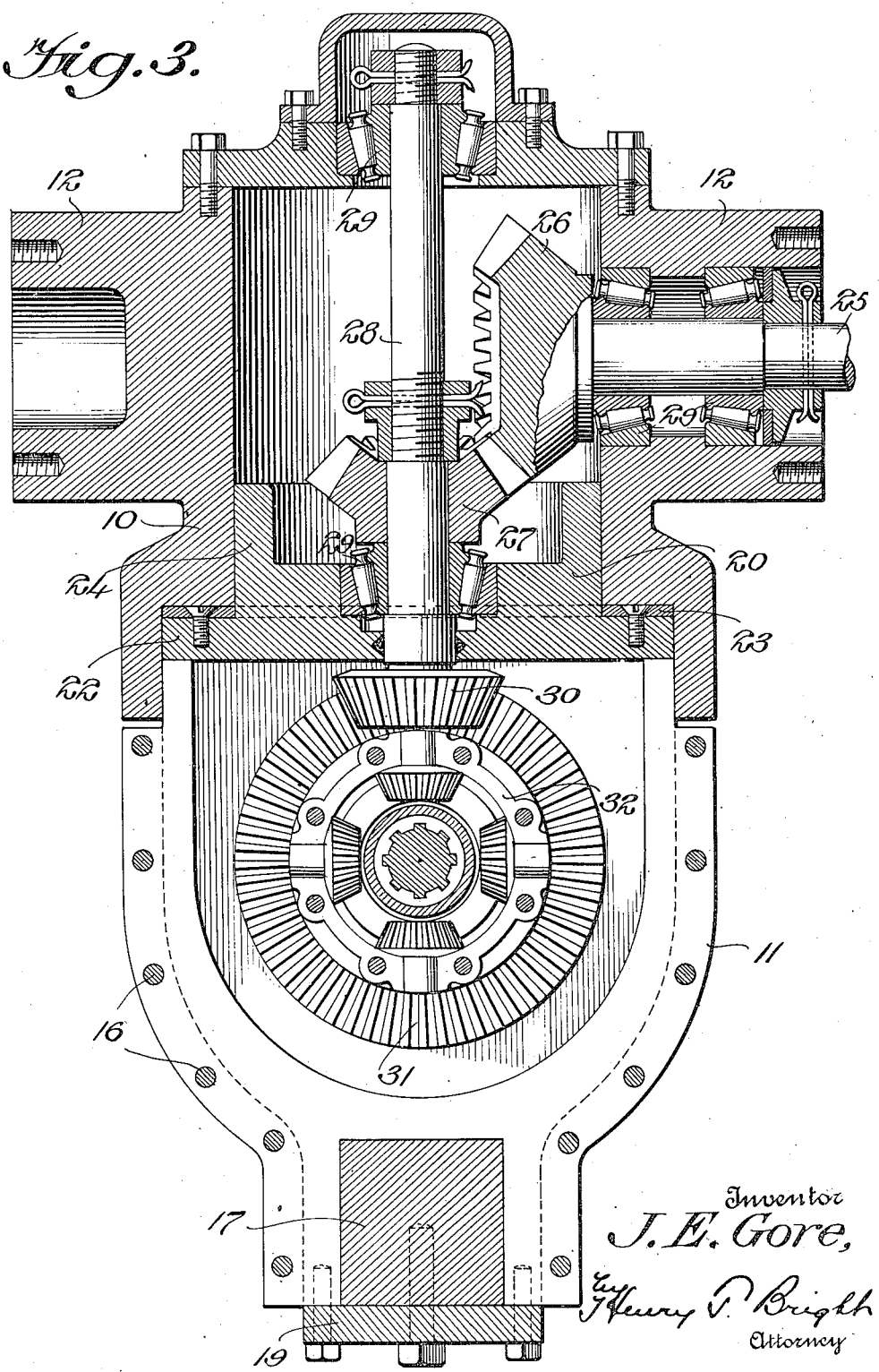

Fig. 1 is a front elevation of a vehicle equipped with my improved mechanism and showing in dotted lines permissible movements of the wheels to accommodate themselves to irregularities in a road surface;

Fig. 2, a plan view of the mechanism shown in Fig. 1 showing in dotted lines permissible movements of the wheels for steering purposes;

Fig. 3, an enlarged vertical section through the mechanism; and

Fig. 4, an enlarged vertical section through the mechanism, the same being taken in a plane at right angles to the sectional plane of Fig. 3.

I will describe my invention as used for transmitting power from the engine to the wheels of a motor vehicle, in which capacity duplicate mechanism will preferably be provided for driving both the front and rear wheels, but it will be understood that if desired only the front or only the rear wheels may be driven and that either the rear or the front wheels whether driven or not driven may be used for steering purposes, or that both the front and rear wheels may be used for steering. In any event since the mechanism associated with the front wheels is a duplicate of the mechanism associated with the rear wheels a detailed description of but one mechanism will suffice for any greater number of mechanisms that may be employed, either for the particular purpose mentioned or for any other purpose.

Referring now to the drawings in detail, it will be observed that my improved mechanism consists essentially of a housing formed of upper and lower sections 10 and 11, respectively, the former of which is mounted for pivotal movement in a plane transversely of the vehicle while the latter is so connected with said first section that it may rotate in a horizontal plane.

In order to mount the section 10 for pivotal movement I provide the same with a pair of diametrically opposed bosses 12 and these are received in suitable bearing openings formed in the lower portions of substantially V-shaped brackets 13 which are bolted or otherwise suitably secured to the vehicle frame 14, plates 15 being bolted or otherwise secured to the outer faces of said bosses in overlapping relation to the bearing portions of said brackets to retain said parts properly assembled.

The lower section 11 is preferably formed of companion halves secured together by means of bolts 16 and within which is received certain differential gearing to be presently described, said section being provided in its under face with a channel to receive the intermediate portion of a dead axle 17 upon the ends of which the wheels 18 are journaled for rotation, a plate 19 being bolted to the section 11 and to the axle whereby the latter is firmly fixed to said section.

A heavy top plate 20 covers the upper portion of section 11 and is secured to the latter by bolts 21 passing down through said plate and threaded into said section, said top plate including a peripheral flange 22 upon the upper face of which is secured a ring 23 of bronze or other suitable wear resisting material, and further including an upstanding cylindrical portion 24 which is snugly received within the hollow cylindrical body portion of the section 10, whereby the two sections are connected for relative rotation in order to permit swinging movement of the axle 17 to effect steering of the vehicle. The weight of the vehicle is supported by the axle through the housing as is obvious. From this arrangement it is thus apparent that the mechanism not only permits the axle to swing horizontally for steering purposes, but also due to the pivotal connection between the section 10 and the frame 14, permits it to tilt vertically during passage of the wheels over irregularities in the ground.

One of the bosses 12 is cored out so that it communicates with the interior of section 10 and through this boss extends a drive shaft 28 carrying at its end within the section 10 a bevel gear 26 which meshes with a similar gear 27 fixed to a vertical shaft 28 mounted within said housing. Both the shaft 25 and the shaft 28 are journaled in suitable anti-friction bearings 29, shaft 25 being journaled with its axis in the pivotal axis of section 10 and shaft 28 being journaled with its axis in the axis of rotation of section 11, as shown, with the result that the gears 26 and 27 will maintain uniform and effective mesh irrespective of the relative angular relation between the axle and the vehicle. The shaft 28 or "king bolt" as it is known in practice extends the full length of the section 10 and its bearings are carried, respectively, by a detachable cap plate covering the upper open end of the section 10, and by the heavy top plate 20 so that the possibility of said shaft being allowed to spring and the effective mesh of the gears thus lost is prevented.

The lower end of the "king bolt" extends through the top plate 20 and within the section 11 carries a drive pinion 30 which meshes with a differential drive gear 31 fixed to and rotatable with a housing 32 journaled in suitable anti-friction bearings carried by said section 11. The differential gearing itself may be of any well known or preferred design for driving a pair of jack shafts 33 which extend through opposite sides of the section 11 and through suitable housings 34 to the wheels 18 which latter are preferably provided with internal gear teeth (not shown) meshing with pinions (not shown) carried at the outer ends of said jack shafts, whereby said wheels are driven. If desired means such as illustrated at 35 may be provided for taking up play between the drive pinion and differential drive gear in order to maintain these gears in proper mesh.

From the foregoing it is apparent that a structure has been provided which enables all operating parts to run in a bath of oil and it is further apparent that the drive to the mechanism may be direct from the engine through shaft 24 or said shaft may be equipped with a sprocket or other device and a chain or similar element may be used as a drive thereto from any suitable source of power.

I claim:—

Mechanism of the class described, comprising a housing composed of upper and lower relatively rotatable sections, drive mechanism within said housing, an upstanding cylindrical portion on said lower section extending into the upper section and having its exterior surface in snug engagement with the interior surface of said upper section, a peripheral flange on the lower section providing a seat for the lower face of the upper section, and a downward cylindrical extension on the upper section embracing the upper portion of the lower section, whereby said sections are maintained securely in vertical alinement during relative rotation thereof.

In testimony whereof I hereunto affix my signature.

JAMES EZRA GORE.